(12) United States Patent
Lee

(10) Patent No.: US 6,237,416 B1
(45) Date of Patent: May 29, 2001

(54) MULTI-PURPOSE IMPACT SENSOR

(75) Inventor: Sang-Moon Lee, Siheung (KR)

(73) Assignee: Sei-Ok Oh, Seoul (KR)

( * ) Notice: Subject to any disclaimer, the term of this patent is extended or adjusted under 35 U.S.C. 154(b) by 0 days.

(21) Appl. No.: 09/399,167

(22) Filed: Sep. 20, 1999

(30) Foreign Application Priority Data

May 21, 1999 (KR) ................................. 99-18377

(51) Int. Cl.[7] .................................................. G01P 15/125
(52) U.S. Cl. .................................................... 73/514.32
(58) Field of Search ............................. 73/514.32, 652, 73/654

(56) References Cited

U.S. PATENT DOCUMENTS

| | | | |
|---|---|---|---|
| 5,492,020 | * | 2/1996 | Okada ............................. 73/862.626 |
| 5,497,668 | * | 3/1996 | Okada ............................. 73/862.626 |
| 5,542,296 | * | 8/1996 | Reidemeister et al. ........... 73/514.32 |
| 5,591,910 | * | 1/1997 | Lin ................................... 73/514.38 |
| 5,719,336 | * | 2/1998 | Ando et al. ...................... 73/514.32 |
| 5,798,460 | * | 8/1998 | Nakagawa et al. ................ 73/654 |
| 5,856,620 | * | 1/1999 | Okada ............................... 73/514.32 |
| 5,962,787 | * | 10/1999 | Okada ............................... 73/514.32 |
| 6,026,690 | * | 8/1998 | Nakagawa et al. .................. 73/654 |

* cited by examiner

Primary Examiner—Richard A. Moller
(74) Attorney, Agent, or Firm—Jacobson, Price, Holman & Stern, PLLC

(57) ABSTRACT

A multi-purpose impact sensor, preferably used in burglar-alarm systems for automobiles or in security systems for access control areas, is disclosed. In the multi-purpose impact sensor, an anode plate having a surface area is set within a metal case, while an elastic and oscillatable cathode plate, having a high restitution, is set within the case at a position above the anode plate. An annular spacer, having a predetermined thickness, is positioned between the anode and cathode plates. Anode and cathode holding rings stably hold the anode and cathode plates at positions above and under the two plates, thus accomplishing a stable arrangement of the annular spacer and the two plates within the case. A PCB is positioned under the anode holding ring. An amplifying device is positioned between the PCB and the anode plate. The multi-purpose impact sensor of this invention has a simple construction, is reduced in size and accomplishes a desired operational reliability of such a system.

8 Claims, 6 Drawing Sheets

MULTI-PURPOSE IMPACT SENSOR

BACKGROUND OF THE INVENTION

1. Field of the Invention

The present invention relates to multi-purpose impact sensors suitable for use in burglar-alarm systems for automobiles or in security systems for access control areas.

2. Description of the Prior Art

As well known to those skilled in the art, burglar-alarm systems for automobiles or security systems for access control areas are conventionally provided with impact sensors, such as piezo-electric sensors or magnetic-coil sensors.

A conventional piezo-electric impact sensor is operated as follows. That is, when external impact is applied to the piezo vibration plate of a piezo-electric impact sensor, the capacitance of the vibration plate is changed. In such a case, the sensor amplifies the capacitance signal and senses the external impact. However, such a piezo-electric impact sensor is problematic in that it uses a vibration plate made of corrosion liable metals. Due to such a corrosion liable vibration plate, the piezo-electric sensor is shortened in the expected life span, and so it is necessary to frequently change the existing sensor of a system with a new one. In addition, the sensitivity of the piezo-electric sensors is easily reduced due to such corrosion liable vibration plates. This finally reduces the operational reliability of the systems.

On the other hand, a conventional magnetic-coil sensor is operated as follows. That is, when external impact is applied to a magnet hung on a flexible suspending means, for example, made of rubber, the magnet is vibrated. In such a case, an induced voltage is generated by a coil positioned around the magnet prior to being amplified, thus allowing the sensor to sense the external impact.

However, it is necessary for such a magnetic-coil sensor to be provided with a means for suspending the magnet. In addition, a coil, having a magnetic core, has to be arranged around the suspended magnet. Therefore, the magnetic-coil sensor is problematic in that the process of assembling the sensor is complicated. In addition, the size of the magnetic-coil sensor is undesirably larger than the other elements of a system due to both the suspending means and the coil.

In the prior art, ultrasonic sensors or infrared sensors, designed to sense a movement of an intruder, may be used in the burglar-alarm systems for automobiles or in the security systems for access control areas. However, it is necessary for these types of sensors to emit powerful ultrasonic rays or infrared rays, and so the sensors exceedingly consume electric power. Another problem of the ultrasonic or infrared sensors resides in that they are expensive and are undesirably limited in sensing area. In addition, such ultrasonic or infrared sensors are designed to sense any movement without discrimination, thus frequently raising unnecessary alarms. This limits use of the ultrasonic or infrared sensors.

In an effort to overcome such problems, the inventor of this invention proposed a multi-purpose impact sensor in Korean Patent Application No. 1994-19393. The above multi-purpose impact sensor is designed to sense an air vibration within a sealed space using a condenser microphone, with the air vibration being caused by external impact applied to the sensor.

In the above multi-purpose impact sensor, a metal weight is installed at the top portion within a sealed elastic rubber cap while being movable in all directions, with a condenser microphone being installed at a position under the weight. When external impact is applied to the sensor, the metal weight swings while changing the pressure within the sealed rubber cap. The changed pressure of air or the air vibration within the sealed cap is transmitted to the condenser microphone, thus allowing the microphone to generate an electric signal.

The above-mentioned multi-purpose impact sensor is free from corrosion different from the conventional piezo-electric sensors. Another advantage of the multi-purpose impact sensor resides in that it accomplishes a desired sensitivity and has a small volume while being produced at low cost different from the conventional magnet-coil sensors. The multi-purpose impact sensor is designed to conserve electric power and to be usable for various purposes different from the conventional ultrasonic or infrared sensors, thus being preferably and widely used for multi-purpose.

However, the above multi-purpose impact sensor is problematic in that it is necessary to form a sealed rubber cap for allowing the vibration plate of the condenser microphone to be vibrated by external impact. In order to prevent the sensor from malfunctioning by unexpected air currents or noises other than external impact, a protection cap has to be installed outside the sealed rubber cap. During the process of producing the multi-purpose impact sensor, the rubber cap has to be hermetically sealed using a special adhesive. This reduces productivity and increases the production cost while producing such impact sensors.

In the above multi-purpose impact sensor, it is necessary to use a spring, which holds the weight while allowing the weight to swing in response to external impact. Such a spring enlarges the volume of the sensor and complicates the process of producing the sensors. It is also very difficult to precisely set the elastic modulus of the spring during a heat treatment process for the spring. This finally allows the sensitivity of the sensor to be nonuniform.

SUMMARY OF THE INVENTION

Accordingly, the present invention has been made keeping in mind the above problems occurring in the prior art, and an object of the present invention is to provide a multi-purpose impact sensor, which is suitable for use in burglar-alarm systems for automobiles or in security systems for access control areas, and which has a simple construction, reduced in size and accomplishes a desired operational reliability of such a system.

In order to accomplish the above object, the present invention provides a multi-purpose impact sensor, comprising: a metal case; an anode plate having a surface area and being set within the case, an elastic and oscillatable cathode plate having a high restitution and being set within the case; an annular spacer having a predetermined thickness and being positioned between the anode and cathode plates; anode and cathode holding rings used for stably holding the anode and cathode plates so as to accomplish a stable arrangement of the annular spacer and the two plates within the case; a printed circuit board (PCB) positioned under the anode holding ring; and an amplifying device positioned between the PCB and the anode plate.

Due to the above-mentioned construction, the multi-purpose impact sensor of this invention is free from a sealed space, a sealed structure or a spring different from conventional impact sensors. The sensor thus has a simple construction, and so it is easily produced through a simple process while accomplishing high productivity and accomplishing a desired operational reliability.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
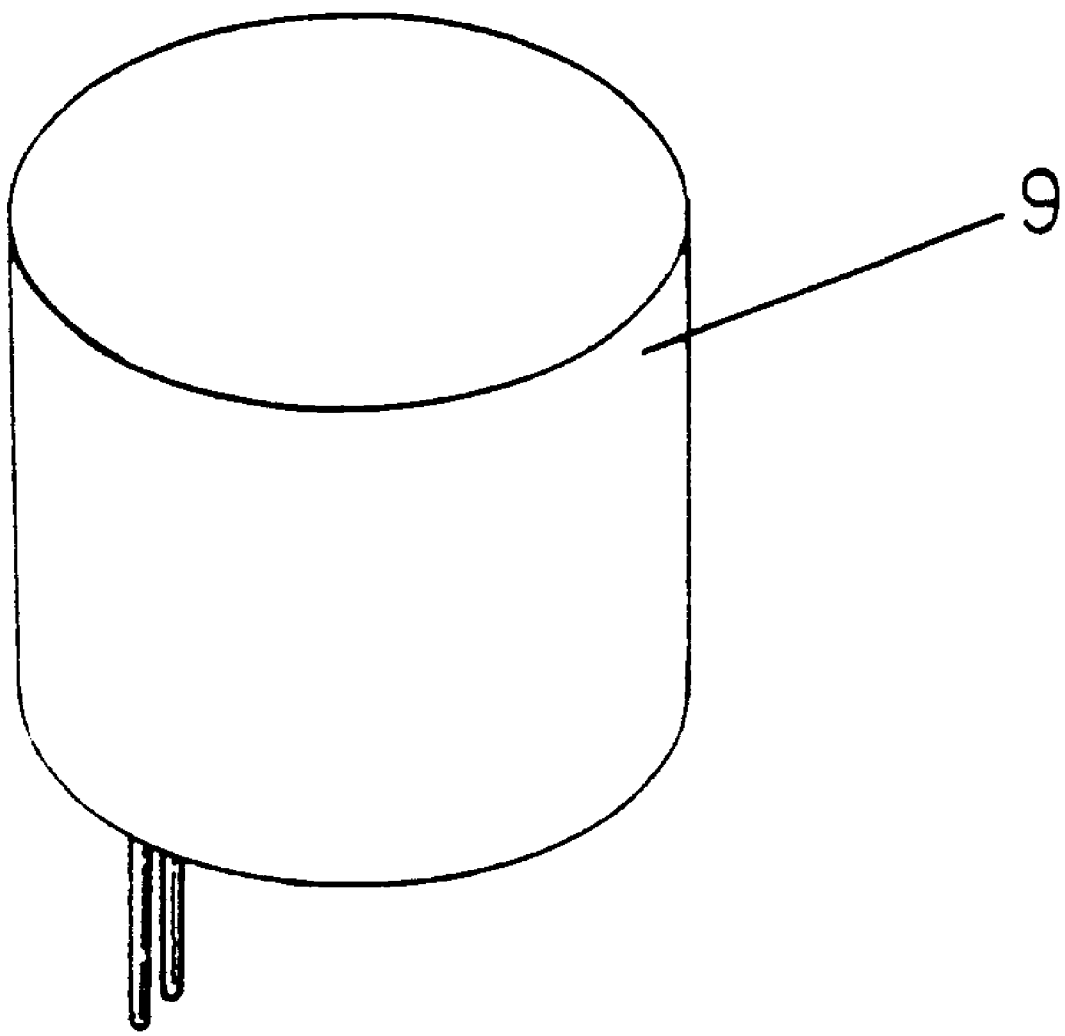
FIG. 1 is a perspective view, showing the appearance of a multi-purpose impact sensor of the present invention.
Figure 2:
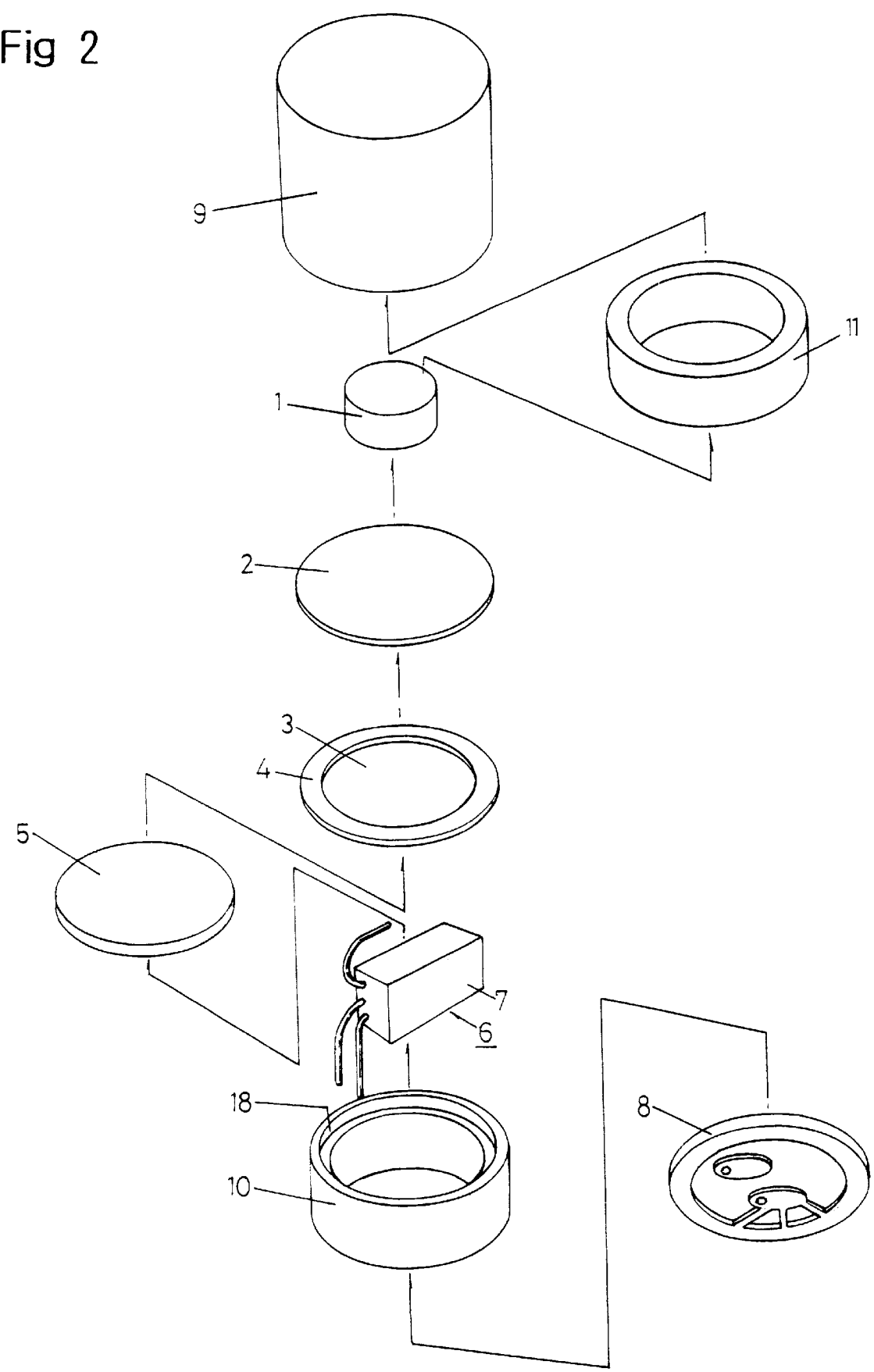
FIG. 2 is an exploded perspective view, showing the construction of the impact sensor according to the primary embodiment of this invention.
Figure 3:
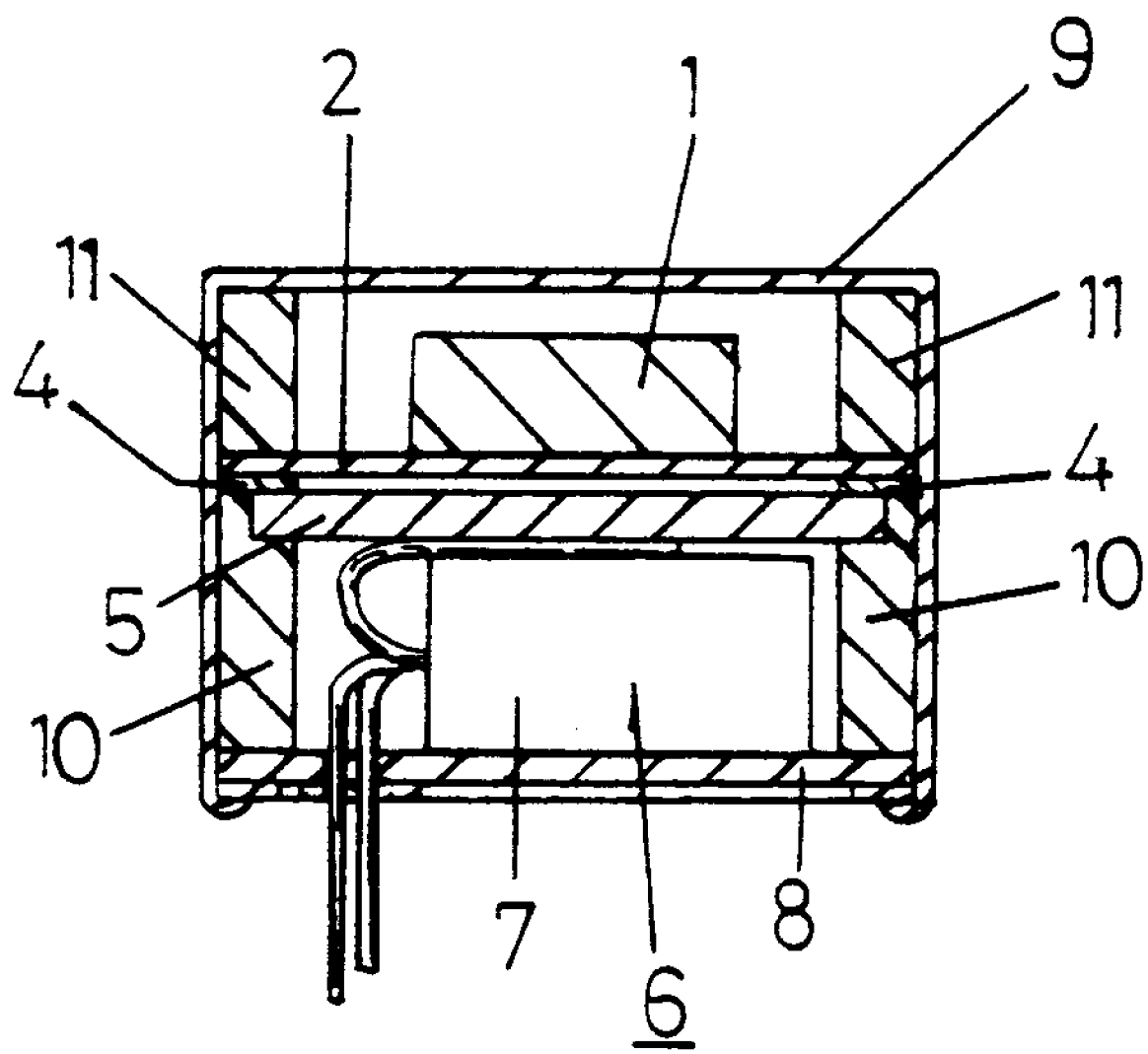
FIG. 3 is a sectional view of the impact sensor of FIG. 2.
Figure 4:
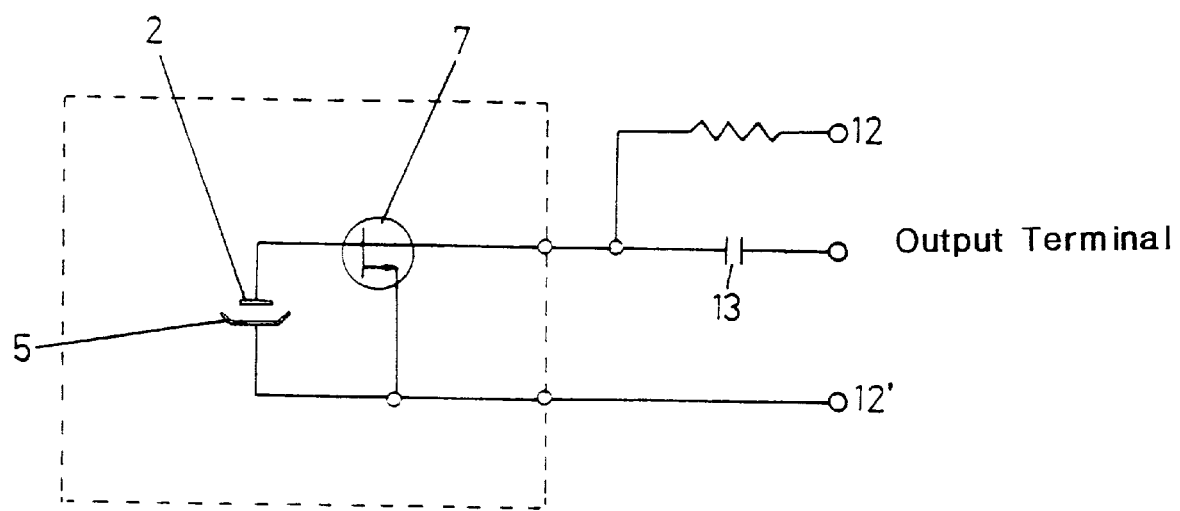
FIG. 4 is a circuit diagram, showing the electric construction of the impact sensor according to this invention.

FIG. 1 is a perspective view, showing the appearance of a multi-purpose impact sensor of the present invention. FIGS. 2 and 3 show the construction of the impact sensor according to the primary embodiment of this invention.

As shown in the drawings, the impact sensor comprises a disc-shaped weight 1 made of ferrous metals, nonferrous metals, or inorganic material, such as ceramic. The above weight 1 is attached to the center of the top surface of a cathode plate 2 using an adhesive. The above cathode plate 2 is made of a conductive metal and is vibrated along with the weight when external impact is applied thereto. The above cathode plate 2 is an elastic member which elastically restores its original position when external impact is removed from the plate 2. An annular spacer 4, having a central opening 3, is positioned under the cathode plate 2. The above spacer 4 is precisely manufactured to have a predetermined thickness suitable for a desired sensitivity according to use. An anode plate 5, made of a conductive metal, is positioned under the spacer 4. The above anode plate 5 is free from being deformed regardless of external impact. An amplifying device 6, consisting of a field effect transistor (FET) 7, is positioned under the anode plate 5. The sensor also has a printed circuit board (PCB) 8, which has a circuit pattern for electrically connecting the abovementioned elements to each other. The abovementioned elements are set within a conductive metal case 9 while being electrically connected to each other and being protected from external impact or electric noises. The lower end of the case 9 is bent inwardly to bring the cathode plate 2 into electric connection with the PCB 8. The cathode plate 2 and the anode plate 5 are respectively held by cathode and anode holding rings 11 and 10 within the case 9, thus accomplishing a stable arrangement. In the drawings, the reference numerals 12 and 12' denote power terminals, and 13 denotes a condenser. 14 and 14' denote steps, and 15 denotes a sectorial opening. 16 denotes a connection rib, and 17 denotes a central weight seat. 18 denotes an anode seating groove, and 19 denotes an insulating material.

In the impact sensor of the present invention, it is preferable to make the drain and the source of the amplifying device 6 pass through holes prior to welding the drain and the source to associated elements, thus accomplishing a complete electric connection of the elements within the case 9.

The above impact sensor is operated as follows.

When electric power of a power source is applied to the power terminals 12 and 12', the drain and source of the FET 7 of the amplifying device 6 are turned on, and so the sensor starts a normal operation. When external impact or vibration is applied to the sensor in the above state, the impact or vibration is transmitted to the weight 1 within the case 9, thus allowing the weight 1 to vibrate along with the cathode plate 2.

Due to such a vibration of the weight 1 along with the cathode plate 2, the gap between the cathode and anode plates 2 and 5 varies. That is, the gap between the cathode plate 2, connected to the source of the amplifying device 6, and the anode plate 5, connected to the gate of the amplifying device 6 having a high input impedance, varies so as to change capacitance.

Such a change in capacitance is amplified by the amplifying device 6 and is output from the drain of the amplifying device 6 to the condenser 13. The changed capacitance is, thereafter, output from the condenser 13 to an amplifier (not shown) wherein the capacitance is amplified into an output signal having a desired level. Therefore, the impact sensor of this invention may be preferably used in burglar-alarm systems for automobiles, security systems for access control areas, or alarm systems for a variety of automated industrial equipment.

The multi-purpose impact sensor of this invention is firmly encased so as to almost completely shield its interior elements from external electromagnetic waves or another external impact, and so the sensor may be preferably used without being limited in place.

In the multi-purpose impact sensor of this invention, both the capacitance changing range between the cathode and anode plates 2 and 5 and the sensitivity of the sensor are controllable by changing the diameter of the central opening 3 of the annular spacer 4 or by changing the thickness of the spacer 4. This allows the impact sensor of this invention to be usable for many related purposes. In the present invention, it is preferable to make the cathode and anode plates 2 and 5 have the same diameter.

In addition, it is necessary for the weight 1 to have a constant weight, and so it is more practicable to make the weight 1 using a ferrous or nonferrous metal suitable for being easily processed through a pressing process.

In the present invention, an operational amplifier (OP amp) in place of the above-mentioned power saving-type PET 7 may be used as the amplifying device 6 of the sensor.

It is also possible to design the size and weight of the weight 1 of the impact sensor according to this invention to allow the weight 1 to be free from swinging regardless of noise having an audio frequency or vibration having a reasonable frequency. Therefore, the sensor of this invention is free from malfunction.

Figure 5:
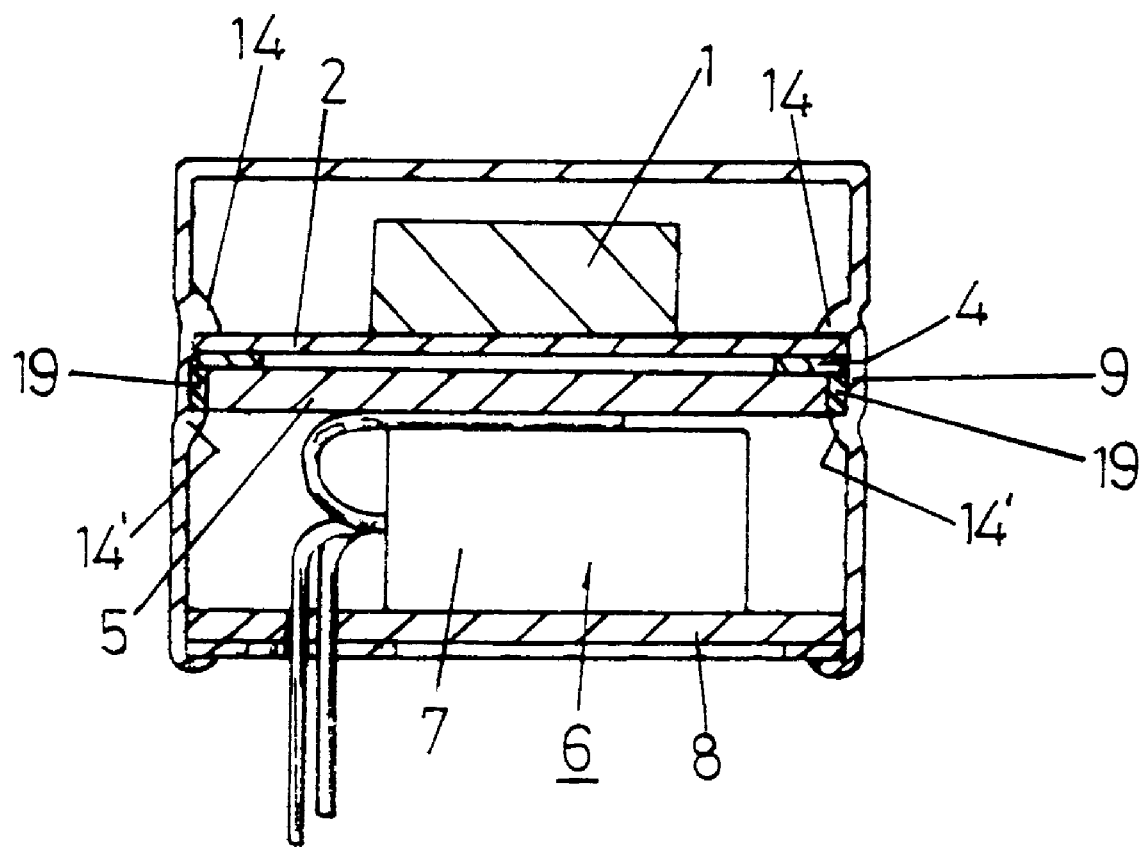
FIG. 5 is a sectional view, showing the construction of a multi-purpose impact sensor according to the second embodiment of this invention.
Figure 6:
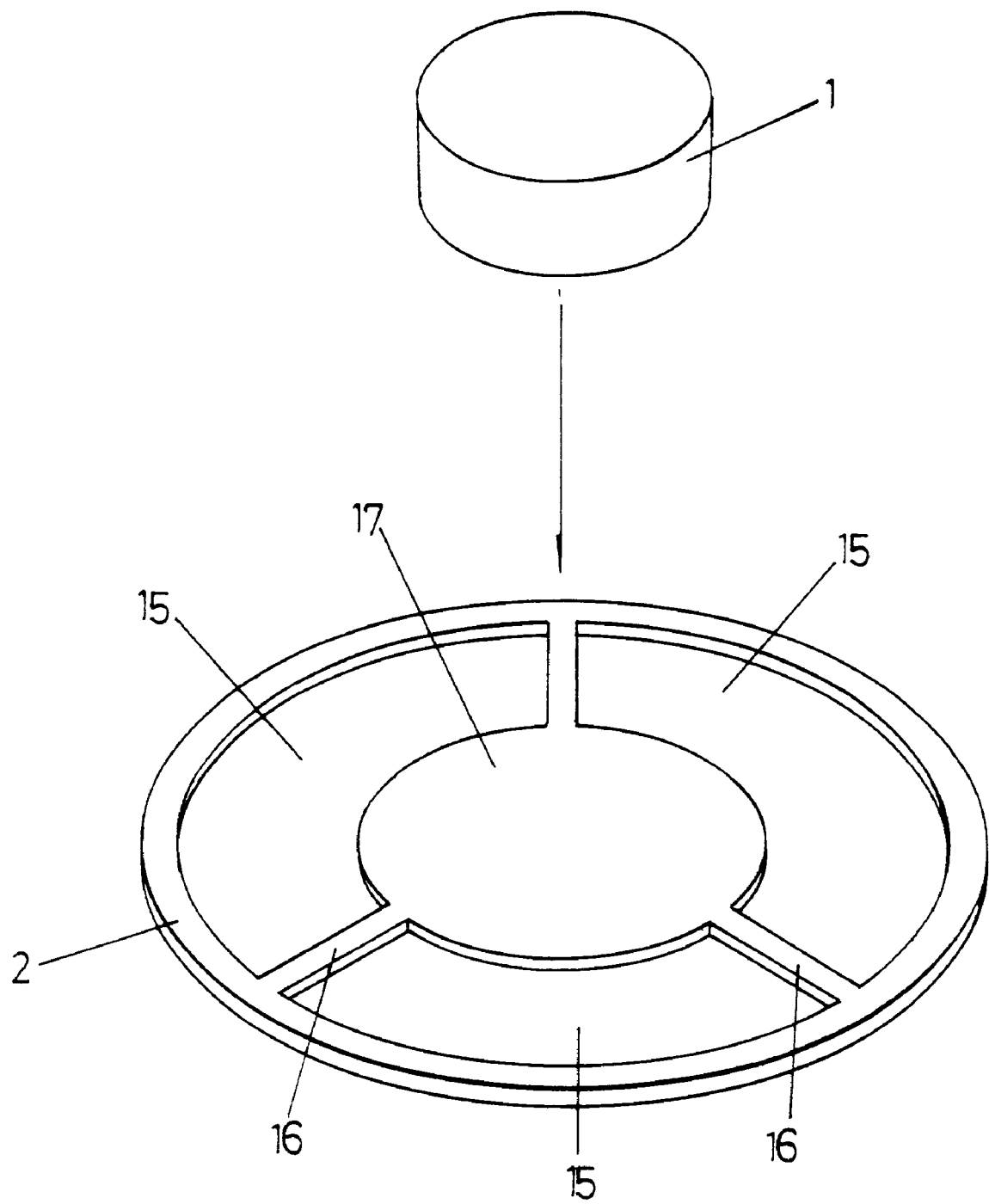
FIG. 6 is an exploded perspective view, showing the configuration of a cathode plate in accordance with the third embodiment of the present invention.

In the primary embodiment, the cathode plate 2 is held by the cathode holding ring 11 positioned above the cathode plate 2, while the anode plate 5 is held by the anode holding ring 10 positioned under the anode plate 5. However, it should be understood that the cathode and anode plates 2 and 5 may be held by steps 14 and 14' formed on the interior surface of the case s sidewall as shown in FIG. 5.

On the other hand, the cathode plate 2 of this invention may be designed to have a plurality of sectorial openings 15, which are regularly formed on the plate 2. In the above cathode plate 2, a central weight seat 17 is held at the center of the plate 2 while being connected to the outside ring through a plurality of connection ribs 16. When the weight 1 is attached to the seat 17 using an adhesive material, the cathode plate 2 allows the weight 1 to more sensitively vibrate in response to external impact. This improves the sensitivity of the impact sensor.

In the impact sensor of this invention, it is preferable to form an anode seating groove 18 along the top end of the anode holding ring 10 as shown in FIG. 2, thus allowing the anode plate 5 to be spaced apart from the case 9. In addition, an insulating material 19 is preferably set along the outside edge of the anode plate 5.

As described above, the present invention provides a multi-purpose impact sensor suitable for use in burglar-alarm systems for automobiles or in security systems for access control areas. The multi-purpose impact sensor of this invention is free from a sealed space, a sealed structure or a spring different from conventional impact sensors, and so the sensor has a small volume and a simple construction. This invention thus simplifies the process of producing the impact sensors and reduces the production cost of the impact sensors.

Since the impact sensor of this invention does not have any spring, the sensor is free from nonuniform sensitivity caused by nonuniform elastic modulus of such a spring. This allows the impact sensor to accomplish a desired operational reliability.

In the present invention, a desirable uniform sensitivity of the impact sensor is controllable by changing the diameter of the central opening of an annular spacer or by changing the thickness of the spacer. This allows the impact sensor to be usable for many related purposes.

The impact sensor of this invention is produced using inexpensive materials, and so it is possible to remarkably reduce the production cost of the impact sensors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-purpose impact sensor, comprising:

a metal case;

an anode plate having a surface area and being set within said case;

an elastic and oscillatable cathode plate having a high restitution and being set within said case at a position above the anode plate to form a gap;

a weight being seated at the center of the cathode plate, said weight for vibrating upon transmission of impact or vibration to vary the gap between said anode plate and said cathode plate;

an annular insulating spacer having a predetermined thickness and being positioned between the anode and cathode plates;

a printed circuit board positioned under said anode plate; and an amplifying device positioned between said printed circuit board and the anode plate.

2. The multi-purpose impact sensor according to claim 1, wherein said weight is made of a metal.

3. The multi-purpose impact sensor according to claim 1, wherein said annular spacer has a central opening.

4. The multi-purpose impact sensor according to claim 1, wherein said amplifying device is a field effect transistor.

5. The multi-purpose impact sensor according to claim 1, wherein said amplifying device is an operational amplifier.

6. The multi-purpose impact sensor according to claim 1, wherein a cathode holding ring and an anode holding ring are arranged above the cathode plate and under the anode plate, respectively, so as to stably hold the cathode and anode plates and to accomplish a stable arrangement of the cathode plate, the annular spacer and the anode plate within the case.

7. The multi-purpose impact sensor according to claim 1, wherein a plurality of steps are formed on an interior surface of a sidewall of said case so as to hold the cathode plate, the annular spacer and the anode plate within the case.

8. The multi-purpose impact sensor according to claim 1, wherein said cathode plate has a plurality of peripheral openings, with a central weight seat being held at the center of the cathode plate while being connected to an outside ring of the cathode plate through a plurality of connection ribs, said central weight seat being used for seating the weight thereon.

* * * * *